of COMPLETING OIL AND GAS WELLS
Achyut K. Phansalkar and Herbert C. Walther, Jr., Ponca City, Okla., assignors to Continental Oil Company, Ponca City, Okla., a corporation of Delaware
No Drawing. Filed July 8, 1964, Ser. No. 381,242
11 Claims. (Cl. 166—33)

This invention relates to the treatment of oil and gas wells to increase the production thereof. More particularly, the present invention is concerned with a technique for simultaneously fracturing and consolidating a relatively loose, weak or semi-consolidated subterranean oil or gas containing sand.

In the technology of oil and gas production, the procedures of fracturing and consolidation are well understood in the art. Subsurface formations containing hydrocarbons can be made more permeable and the drainage area of a well bore effectively increased by fracturing. In hydraulic fracturing, at least one crevice or cavity is created and extended outwardly from the well bore by injection into the well bore of a fracturing fluid at a pressure in excess of the overburden pressure. It is common practice to incorporate into the fracturing fluid a fluid loss additive which tends to block the pores of the formation at the face of the fracture, thereby decreasing the loss of fracturing fluid to the formation and increasing the area of fracture created per unit volume of fracturing fluid. At least the major portion of the fracturing fluid also generally contains propping agents, i.e., particulate materials such as sand, aluminum pellets, glass beads, or walnut hulls which are retained in the fracture at the end of the fracturing treatment and prevent the overburden pressure from closing or "healing" the fracture.

In the case of fractured formations in which the producing sand is very poorly consolidated, a decrease in rate of fluid flow oftentimes occurs upon extended production. It is believed that the loss or decrease in production which occurs in this situation results from the gradual interpenetration of small particles of sand from the producing formation into the interstices of the larger particles of the propping agent, thus blocking the pores through the propping agent and reducing its permeability. The advanced stages of this "choking" of the propping agent by formation particles is frequently evidenced by the production of sand in the formation fluid.

Efforts have previously been made to enhance the mechanical strength of the propping agent by either injecting a consolidating agent into the formation simultaneously with the propping agent, or by injecting such consolidating agent into the propping material packed in the fracture after the propping agent has been positioned in the fracture. This procedure has also been used in an attempt to avoid the reduction in production resulting from sand infiltration of the pore spaces of the propping agent. The consolidating agents employed in these techniques are well-known and function to bond the particles of the propping agent to each other at the points where such particles are in contact while preserving the permeability of the propping agent mass. Generally, the consolidating agent will be injected into the fracture in the form of a relatively concentrated solution of a resinous consolidating agent in a suitable solvent. Usually the concentration of the resin solution used for consolidation is at least 30 percent by weight and is often as high as 50 or 60 percent by weight. When used in these concentrations, the consolidating agent completely fills the interstices between the propping agent particles.

In order to clear the pores or void spaces between the particles to be consolidated, it is then necessary to displace or remove that portion of the consolidating resin which fills the voids between these particles. This is accomplished by a procedure which is termed "overflushing." In overflushing, an inert liquid, such as diesel oil, is injected into the fracture and displaces from the propping agent all of the consolidating resin except that which is coated on the particles at the points where they contact each other. Thus, the resinous consolidating agent is displaced from the pores of the propping agent to restore the permeability thereof and is dissipated into the surrounding formation.

After the consolidating agent sets up, the propping agent is itself consolidated and rendered substantially more rigid. The described consolidation procedure, while improving the compressive strength of the propping agent packed in the fracture, does not effectively prevent the infiltration of the relatively small particles of formation sand into the interstices of the material used as a propping agent. Thus, consolidation of the type described does not effectively prevent the occurrence of the loss of production which may ultimately arise as a result of the infiltration of small sand particles into the propping agent.

The present invention constitutes a method for creating a fracture in a semi-consolidated or weakly consolidated oil producing formation. By the terms "loose," "weak" or "semi-consolidated" sand is intended a sand matrix whose particles tend to at least partially shift or migrate upon application of a pressure differential, such as flow therethrough of a fluid. In the practice of the invention, the problems associated with the lack of consolidation in the fractured formation are overcome by the use of a novel technique which results in the consolidation of the formation surrounding and defining the fracture without a concurrent substantial loss in the permeability thereof and without the usual requirement of overflushing to remove excessive amounts of consolidating agent. The method is particularly useful in preventing the choking or blocking of a propping agent which is injected into the fracture by reason of the infiltration into the interstices of the propping agent of small particles of sand or material from the surrounding semi-consolidated formation.

Broadly described, the method of the present invention comprises first initiating a horizontal or vertical fracture in the formation surrounding a well bore using techniques now well-understood in the fracturing art. After initiation of the fracture, the fracture is extended or propagated by the continued injection into the well and fracture of a suitable fracturing fluid under a relatively high pressure. Concurrently with such injection, a dilute solution of a plastic or resinous consolidating agent is circulated into the formation via the fracture. The consolidating agent is preferably introduced as a dilute solution of the resin in a suitable solvent vehicle which is mixed with the fracturing fluid. Oxygenated organic solvents and particularly alkanols are suitable vehicles for the resinous consolidating agents. The consolidating agent solution may be injected as one or more slugs at one or more intervals during the fracturing, but, as hereinafter described, is preferably injected after the fracture has been enlarged to, or nearly to, the maximum extent desired.

Since it is desirable that a certain amount of the fracturing fluid be dispersed into the formation during the fracturing process in order to distribute the consolidating agent therein, little or no fluid loss control additive is used in the fracturing fluid. Only in instances where it is desired to produce a relatively large fracture and the formation permeability is such as to result in an excessive or intolerable rate of loss of the fracturing fluid should a limited amount of a fluid loss control additive be included in the fracturing fluid. In many instances, it will be desirable to include in the fracturing fluid, conventional concentration of sand, aluminum spheres or other well-known and now used granular material to function as a propping agent and retain the fracture in its distended state. As a result of the use of the consolidating agent in dilute concentrations, no overflushing step is required, and the loose or semi-consolidated formation materials defining the fracture are bonded to each other so that little infiltration of the formation materials into the fracture is experienced.

From the foregoing description of the invention, it will have become apparent that it is a major object of the present invention to provide a novel and improved technique for creating and extending a fracture in a semi-consolidated hydrocarbon-bearing formation so that the economics of producing the hydrocarbon are substantially improved.

Another object of the present invention is to provide a relatively inexpensive fracturing technique which may be used to advantage in extending a fracture into formation which is composed of semi-consolidated or loose oil sand, or other hydrocarbon-bearing matrix.

A further object of the present invention is to provide a method for consolidating the formation materials surrounding a fracture which has been extended into a relatively semi-consolidated hydrocarbon-bearing formation.

Additional objects and advantages of the invention will become apparent as the following detailed disclosure of the invention is read.

As hereinbefore described, the first procedure in the practice of the present invention is the initiation of a horizontal or vertical fracture in a hydrocarbon-bearing formation traversed by a well bore. Methods of fracture initiation are well-known and, except as utilized in combination with the other procedures used in the present invention, do not constitute a part of the invention. Several fracture initiation techniques known to the art will, however, be briefly mentioned in order to provide a further and more complete understanding of the invention.

In some instances, a fracture is initiated by passing the hydraulic or fracturing fluid into the well bore and packing off the formation so as to permit the fracturing fluid to exert pressure along the face of the formation at the well bore. The pressure upon the fracturing fluid is then increased until the formation is parted along a bedding plane or other zone of weakness. The fracturing fluid is forced into the crack and extends the fracture for a substantial distance into the formation. In other instances, it may be desired to initiate the fracture by first perforating the formation using a gun perforating device or a jet perforator, or by incising or abrading the formation with other tools and techniques well-known in the fracturing art. The formation may be perforated or abraded along a vertical line to induce a vertical fracture in the formation or may be perforated in a horizontal plane to induce a radially extending fracture.

The fluid utilized in the fracturing operation may be of any suitable type, such as a low penetrating fluid or gel. Ordinary crude oil generally functions quite well. In the practice of the present invention, the fracturing fluid is preferably a hydrocarbon fluid which is compatible with any one of the types of resinous consolidating agents now in use. These materials include thermo-setting resins, such as phenol formaldehyde, urea formaldehyde, the epoxy resins, various acrylate resins and the like. Other examples of the thermo-setting resin-forming liquids and their manner of use in wells are described in detail in a number of places, such as in United States Patents 2,485,527; 2,541,688; 2,674,322; and 2,674,323. In addition to the resinous consolidating agents, varying amounts of an alkali catalyst, such as sodium hydroxide, can be added to the mixed fracturing fluid and consolidating agent. The selection of the catalyst, if one is used, depends upon the temperature at the formation depth, and the desired setting time to influence and control the setting of the liquid resin to a solid. Many of the better-known consolidating agents are commercially available, and if compatible with the hydrocarbon hydraulic fluid used for fracturing, are suitable for use in the present invention. As previously indicated, the fracturing fluid which is preferred for use in this invention is a hydrocarbon material, such as diesel oil, crude oil or pale oil. The resinous consolidating agent is preferably added to the fracturing fluid as a dilute alcoholic solution as more fully hereinafter described.

One of the major departures of the present invention from fracturing and consolidation techniques previously used resides in the low concentration of plastic consolidating agent which is employed. Thus, although resinous materials used for purposes of consolidation of loose oil sands are usually present in the carrying vehicle in a concentration of from 30 to 60 percent, the present invention employs the resin consolidating agent in a concentration of only from about 1 to about 20 percent, with from 3 to 15 percent of the resin being preferred. The solvent for the consolidating agent is preferably an alkanol with iso-propanol being an especially effective solvent.

We have found that by the use of such relatively dilute concentrations of the consolidating agent, the agent is thoroughly dispersed in the producing sand at and adjacent the face of the fracture, and is present therein only in an amount sufficient to bond the formation particles to each other at their points of contact. The interstices of the formation material is maintained clear of the consolidating agent by the continued passage therethrough of the fracturing fluid. The resinous consolidating agent from the fracturing fluid solution is preferentially adsorbed on the formation sand as the fracturing fluid is forced therethrough, and the resin functions to consolidate the producing formation without substantial loss of permeability. Described in a different way, the fracturing fluid carrying the consolidating agent is lost to some extent by the usual fluid loss conditions to the formation adjacent the fracture. As such loss occurs, the consolidating agent carried in a relatively dilute amount by the alcohol mixed with the fracturing fluid is brought into contact with the sands surrounding the fracture and consolidates the sand by bonding the particles thereof to each other.

The alcoholic solution of consolidating agent may be injected as a slug preceding the initial volume of injected fracturing fluid, but is preferably introduced after the fracture has been extended into the formation to the extent desired. In the latter case, the pressure on the fracturing fluid is reduced to terminate the fracture propagation and the dilute alcoholic solution is mixed with fracturing fluid and circulated into the fracture under just enough pressure to force the fracturing fluid-consolidating agent mixture out into the formation adjacent the face of the fracture. Generally, enough of the mixture is circulated into the formation to consolidate the formation for from 0.5 to 10 to 12 inches or more into the formation adjacent the fracture.

In order to effect the described mechanism of distribution, it is desirable, as hereinbefore indicated, to either omit, or use only very minute amounts of, fluid loss agents in the hydraulic fluid for the usual purpose of precluding undesirably high losses of the fluid to the surrounding formation. Of course, in instances where an especially large fracture is to be formed, or in instances where the fracturing fluid is being lost at an impractically high rate, then a sufficient amount of fluid loss additive should be included in the fracturing fluid to bring the loss of fluid under satisfactory control. Fluid loss control agents which can be used if necessary are well-known in the art and include such oil-insoluble materials as blown asphalt and rubber, calcium carbonate, calcium chloride, fuller's earth, and varying amounts and types of agglutinants of either the anionic or cationic types. For additional details relative to fluid loss control compositions, reference is made to J. L. Brown et al. United States Patent 2,779,735.

The inclusion of conventional amounts of propping agents in the fracturing fluid is not incompatible with the simultaneous or subsequent presence in the fracturing fluid of the resinous consolidating materials. Thus, the solution may have suspended therein conventional concentrations of sand or other granular material of the type used to prop the formation open along the fracture. Where the consolidating agent and propping agent are concurrently injected into the fracture for propagating the fracture, consolidating the semi-consolidated sand at the face of the fracture and preventing healing of the fracture, the consolidating agent further functions to consolidate the propping agent in the fracture and to alleviate, or completely avoid, substantial crushing of the propping agent once the pressure on the fracturing fluid is released. It is again to be noted that the relatively low concentration of the consolidating agent utilized in the fracturing fluid avoids blocking or obstruction of the pores through the propping agent located in the fracture, the consolidating agent functioning only to bind the particles of propping agent to each other at the points where the particles are in contact.

Because of the relatively dilute solution of consolidating resins which are used, it is unnecessary to follow the conventional procedure of overflushing by passing a material, such as diesel oil or other liquid, through the propping agent and the surrounding formation in order to remove the excess consolidating agent from the interstices of the particulate materials. In other words, neither the permeability of the propping agent in place in the fracture, nor the permeability of the surrounding formation, is substantially impaired by the consolidating agent, yet the consolidating agent is present in sufficient quantities to substantially enhance the mechanical strength and stability of both the propping agent and the hydrocarbon-bearing sand of the formation.

After propagation of the fracture to the extent desired, and following introduction of the dilute solution of propping agent, pressure on the fracturing fluid is released and the fracturing fluid is removed by way of the injection well. Sufficient time is, of course, allowed to elapse before release of the hydraulic pressure in order for the plastic consolidating agent to set up to a hardened state. After release of the pressure on the fracturing fluid, the well may be placed on production and the result of the described operation will be a stable fracture created in a semi-consolidated sand. Since the region adjacent the faces of the fracture has been consolidated by injection of the consolidating agent thereinto, the fracture will not become plugged by the formation sand over a period of continued production, and its conductivity for the hydrocarbon being produced will remain high. Moreover, when a propping agent has been injected into the fracture and also consolidated, the propping agent is better able to withstand high overburden pressures over extended periods of time.

Instead of proceeding in the precise sequence of steps which has been hereinbefore described, it may, in some instances, be desirable to initially extend the fracture into the formation to the extent desired, using the dilute alcoholic solution of consolidating agent mixed with the fracturing fluid. Toward the end of the fracture propagation, the pressure on the fracturing fluid may be decreased to the point where a fracture is not being substantially extended, but the fracturing fluid is being injected into a formation surrounding the fracture at a rate substantially equal to the rate of input of the fracturing fluid to the injection well. After sufficient consolidating agent has been injected into the formation to achieve consolidation of the formation to the extent desired, either the fracturing fluid or any other suitable or more desirable fluid containing sand or other propping agent in solution may be used to follow the fracturing fluid to establish the propping agent in the fracture. This can usually be carried out without waiting for the consolidating agent to set up to a hardened state in the surrounding formation. After the propping agent has been positioned in the fracture, and a total elapsed time sufficient to permit the consolidating agent to set up has occurred, hydraulic pressure is then released. The well may then be placed on production.

From the foregoing description of the invention, it will be apparent that the present invention provides a relatively easily practiced, inexpensive method for providing a durable fracture in a semi-consolidated hydrocarbon production formation. The method of the invention can be employed with or without the concurrent use of a propping agent to prop the fracture developed in the course of the procedure, and accomplishes the consolidation of the semi-consolidated producing sand surrounding the fracture without using excessive or uneconomic quantities of consolidating agent or the expensive additional procedure of overflushing.

The following example is illustrative of the invention but is not intended to limit the scope thereof.

*Example*

A well in southern Louisiana is completed in a poorly consolidated sandstone formation. The well is hydraulically fractured, and the formation surrounding the fracture created is consolidated by the following procedure. The fracture is initiated by injecting into the well 300 gallons of lease crude oil at a pressure sufficient to part the formation. The fracture is then extended by injecting into the well 4,000 gallons of the same lease crude oil containing 200 pounds particulated blown asphalt having a particle size of less than 100 mesh as a fluid loss additive and 4,000 pounds 20 to 40 mesh sand as a propping agent. Next, a mixture of 920 gallons lease crude oil and 300 gallons phenol-formaldehyde resin solution (further described below) is injected into the well to fill the fracture. Lastly, 400 gallons lease crude oil is injected into the well to force the mixture of lease crude oil and phenol-formaldehyde resin solution into the formation adjacent the fracture. The well is shut in 24 hours to allow the resin to set and then returned to production. Subsequent production occurs at a substantially constant high rate. The produced fluids are free of sand particles. This indicates that the well has been fractured to increase the well drainage area and that the walls of the fracture have been consolidated so that sloughing of sand into the fracture has been minimized.

The particular phenol-formaldehyde resin solution used in this example is prepared by mixing together 390 pounds of phenol, 506 pounds of formaldehyde and 25 pounds of sodium hydroxide dissolved in 25 pounds of water. The mixture is heated to 175° F. in a vented jacketed reaction vessel. As the reaction proceeds, cooling water is circulated in the jacket to prevent the reaction mass from becoming hotter than about 175° F. After the viscosity reached 47 cps., the reaction mass is cooled to 80° F. To the cooled mass is added 7.8 gallons of 32 percent hydrochloric acid with stirring. The acidified mixture is settled, allowing the formation of two liquid layers. The top layer which consists mainly of sodium chloride dissolved in water is discarded. The lower liquid layer consists of 697.3 pounds of resinous liquid having a density of 10.0 pounds per gallon and a viscosity of 80° F. of 230 cps. To this resinous liquid is added 100 gallons isopropyl alcohol. Just before being used, 18.6 pounds sodium hydroxide catalyst as a 25 percent by weight aqueous solution is added to the resinous liquid.

The invention has been described with reference being made to certain specific examples of its practice and to certain particular materials which can be used in carrying out the procedures which are entailed in its practice. It will be understood, however, that certain variations and modifications in the steps of the process, as well as in the materials employed, can be adopted without departure from the basic principles upon which the invention is based. Insofar, therefore, as these principles continue to be relied upon in fracturing and consolidation procedures, such procedures are considered to be circumscribed by the spirit and scope of the present invention except as the same may be necessarily limited by the appended claims or reasonable equivalents thereof.

What is claimed is:
1. The method of completing a well to produce hydrocarbons from a semi-consolidated formation of low permeability which comprises:
   (a) injecting a fracturing fluid under pressure into said formation via said well to extend a fracture into said formation;
   (b) during the circulation of said fracturing fluid into the fracture, injecting a liquid consolidating agent in a concentration of from about 1 percent by weight to about 20 percent by weight into said fracture under sufficient pressure to force said liquid consolidating agents and fracturing fluid into the formation adjacent said fracture; and
   (c) shutting in the well for a time sufficient for the consolidating agent to set and bond together the particles of the formation adjacent said fracture into a permeable oil-insoluble mass.
2. The method defined in claim 1 wherein the fracturing fluid is a hydrocarbon.
3. The method defined in claim 1 wherein the consolidating agent is a thermo-setting resin.
4. The method defined in claim 1 wherein the concentration of the consolidating agent is from about 3 percent by weight to about 15 percent by weight.
5. The method defined in claim 1 wherein an amount of the consolidating agent is employed which is sufficient to penetrate the formation for a distance of at least 0.5 inch adjacent the fracture.
6. The method as defined in claim 1 wherein a propping agent is suspended in said fracturing fluid and circulated into the fracture with said fracturing fluid.
7. The method of fracturing a semi-consolidated formation to increase the production of hydrocarbons therefrom via a well, which method comprises:
   (a) forming a well bore traversing the formation;
   (b) initiating a fracture in the face of the formation opposite the well bore;
   (c) injecting a fracturing fluid under pressure into the fracture via the well bore to propagate the fracture into the formation;
   (d) injecting into the propagated fracture in admixture with a portion of said fracturing fluid, a fracturing fluid-compatible solution of a liquid consolidating agent with the concentration of said liquid consolidating agent in said solution being from about 1 percent by weight to about 20 percent by weight; and
   (e) shutting in the well for a time sufficient for the consolidating agent to set and bond together the particles of the formation adjacent said fracture into a permeable oil-insoluble mass.
8. The method defined in claim 7 wherein said consolidating agent is a thermo-setting synthetic resin and is dissolved in an alcoholic carrier.
9. The method defined in claim 7 wherein said consolidating agent solution is admixed with said fracturing fluid after said fracture has been propagated to the maximum extent desired.
10. The method defined in claim 7 wherein the concentration of said consolidating agent in its solution is from about 3 percent by weight to about 15 percent by weight.
11. The method defined in claim 7 wherein a propping agent is suspended in said fracturing fluid during the propogation of said fracture, and said consolidating agent solution is injected into said propagated fracture after said fracturing fluid suspension of propping agent has been injected thereinto.

References Cited
UNITED STATES PATENTS

| | | | |
|---|---|---|---|
| 2,815,815 | 12/1957 | Hower | 166—33 X |
| 2,827,121 | 3/1958 | Nowak | 166—33 X |
| 2,896,717 | 7/1959 | Howard | 166—33 |
| 2,986,538 | 5/1961 | Nesbitt et al. | 166—33 X |
| 3,097,694 | 7/1963 | Kerver | 166—42.1 |
| 3,198,253 | 8/1965 | Holbert | 166—33 |
| 3,208,522 | 9/1965 | Roebuck et al. | 166—42.1 |

ERNEST R. PURSER, *Primary Examiner.*

DAVID H. BROWN, CHARLES E. O'CONNELL, JACOB L. NACKENOFF, *Examiners.*